July 16, 1957 A. MACK 2,799,724
TELEGRAPH REPEATER
Filed June 1, 1954
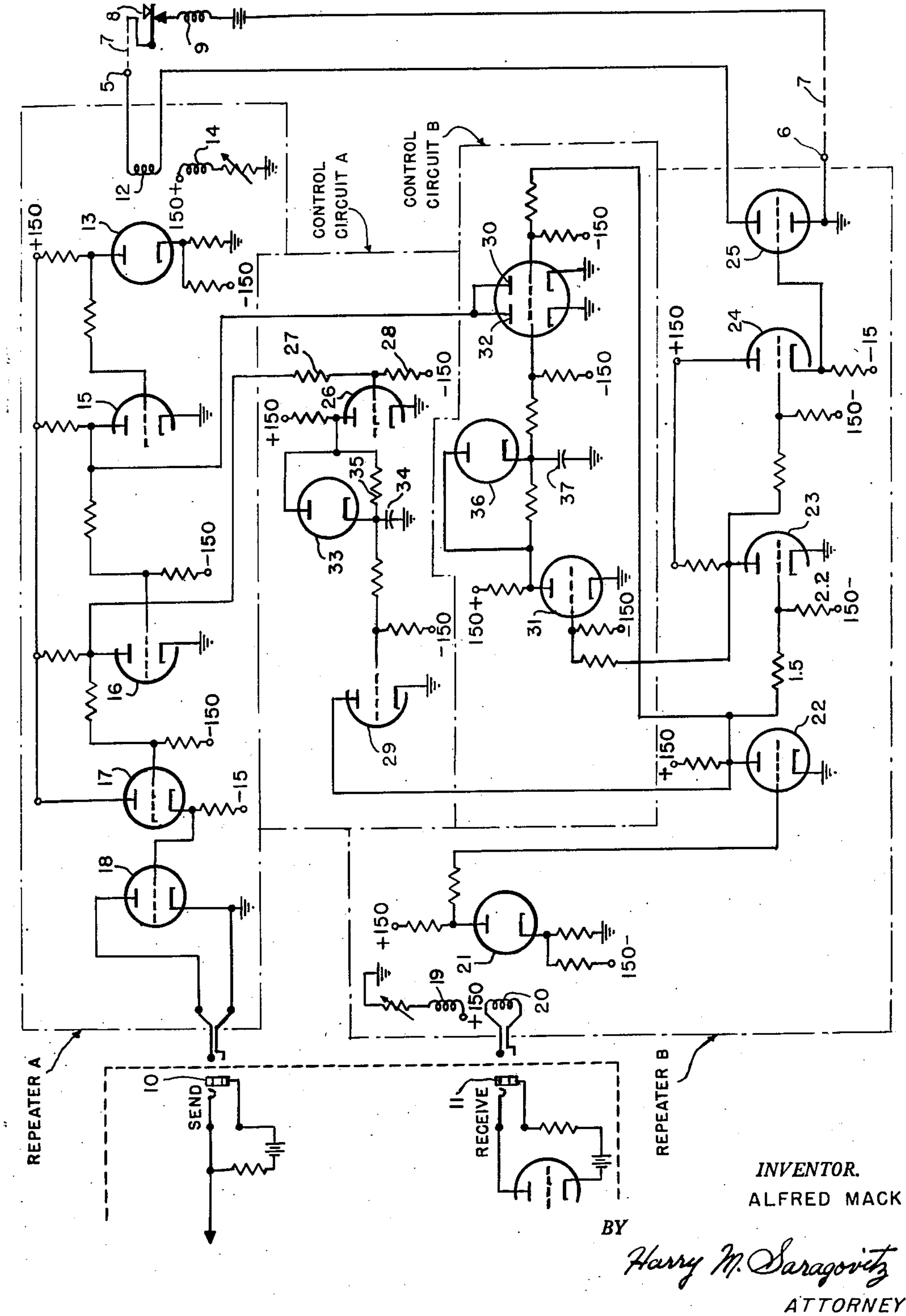
INVENTOR.
ALFRED MACK
BY
Harry M. Saragovitz
ATTORNEY United States Patent Office 2,799,724

Patented July 16, 1957

2,799,724

TELEGRAPH REPEATER

Alfred Mack, Little Silver, N. J., assignor to the United States of America as represented by the Secretary of the Army Application June 1, 1954, Serial No. 433,852

5 Claims. (Cl. 178—71)

(Granted under Title 35, U. S. Code (1952), sec. 266)

The invention described herein may be manufactured and used by or for the Government for governmental purposes without the payment of any royalty thereon.

This invention relates to apparatus for repeating signals received at a given point and transmitted to another point and relates particularly to repeating apparatus which is automatic in operation and which may be used to interconnect two telegraphic circuits.

For purposes of illustration the invention will be described in connection with its use for interconnecting a conventional telegraphic four wire circuit which possesses automatic one way reversible operation with a conventional two way loop circuit. It will become apparent from the following description, however, that the invention may be used in connection with other types of telegraphic or communication circuits.

The repeater of the invention consists of an all electronic system having two communication channels containing electronic tubes through which signals are relayed from one telegraph line to another to actuate remote receiving devices; the respective channels operating in different directions.

Each of these communication channels are provided with permanently connected electronic control circuits which act automatically to isolate one of the communication channels from the other channel while the first channel is functioning. Also when the second channel is functioning the other control circuit will function to isolate it from the first communication channel. The apparatus also has other specific functions which will be pointed out in detail hereinafter.

It is a primary object of the invention to interconnect through the medium of a repeater device two otherwise incompatible communication circuits.

A further object of the invention is to provide a completely automatic repeater device which facilitates the free transmission and reception of messages over the same transmission lines without manual or mechanical switching means.

A further object of the invention is to provide repeater service for telegraphic installations which is highly reliable in operation and which requires no supervision.

A still further object of the invention is to provide communication repeating apparatus which is highly flexible in its adaptation to varying requirements for service.

A still further object of the invention is to provide a repeater unit for communication circuits which is light in weight, compact in structure and highly portable.

Other objects and features of the invention will more fully appear from the following description and will be particularly pointed out in the claims.

To present a better understanding of the invention a particular embodiment thereof will be described and illustrated in the accompanying drawing which illustrates diagrammatically the elements and circuits of the apparatus.

The embodiment of the invention shown in the drawing functions as a repeater between telegraphic lines such as are used in handling ordinary telegraphic traffic or teletypewriter traffic. The apparatus described illustrates the ability of the device to link two different types of telegraph lines whose characteristics are incompatible, that is to establish repeater service between lines that would normally require certain hand switching operations, at the point of repetition, to interconnect the two lines. The invention provides automatic operation of such telegraphic service.

In the apparatus to be described repeater service is established between two telegraphic lines known to those skilled in the art as respectively a half duplex loop and a four wire one way automatically reversible loop. The half duplex loop presents a pair of terminals 5 and 6. These terminals constitute the terminus point of the loop circuit 7 which may extend to a remote station from which signals are sent. Such a loop circuit is usually provided, in the case of teletypewriter service, with a switching means indicated as the keyboard 8 of a teletypewriter and in series therewith the winding of the selector magnet of the teletypewriter printer, both of which are situated at the remote point where they function to receive and transmit signals in the conventional manner.

The other telegraphic line, which is interconnected to the loop circuit 7 by the invention, presents to the repeater two pairs of terminals. One pair of terminals are connected to the transmission portion of the above mentioned four wire line. These terminals are connected to the socket portion of a plug-in jack 10. The other pair of terminals lead to the receiving elements of the four wire line and are connected to the socket portion of a plug-in jack 11. This four wire line performs certain conventional functions which take place locally at the panel of the telegraph station at which the repeater is housed. Since the apparatus for performing these conventional functions forms no part of the invention, it is believed unnecessary to describe them in detail.

Proceeding now to a detailed description of the invention the complete circuit arrangements will be divided into four sections to aid in presenting the several functions of the apparatus. The four sections will be designated respectively repeater section A, repeater section B, control section A for controlling repeater section B and control section B for controlling repeater section A.

The elements and their function in repeater section A will first be described. For illustrative purposes control circuit A will subsequently be described. It will be assumed that teletypewriter or other signals are being received through the loop circuit 7 and are applied through the terminals 5 and 6 to the control coil 12 of a magnetically controlled diode tube 13. Power to provide these signals may be obtained from any suitable source such as a battery connected in the loop. It will be noted that the loop has connected therein a triode tube 25. As will appear hereinafter this tube is automatically maintained in conducting condition when the signals are being transmitted through the loop 7. The tube 13 also has a magnetic biasing coil 14 which is locally energized from a power supply either external to or built into the repeater. The two coils associated with the tube are located axially with respect to the elements thereof thereby to immerse electrons, in the electron path between the elements of the tube, in the magnetic fields of the coils. The polarity of the energy supplied to the coil 14 and an indication of a suitable potential is shown in the drawing. In each instance hereinafter where a power connection is made it will be indicated on the drawing as above suggested in connection with the coil 14. The potential applied to the coil 14 is manually adjustable to control the overall inductive effect upon the electron flow in the tube and is so adjusted that the modulation provided by an incoming signal applied to the coil 12 will alternately cut off or permit flow of energy in the tube. The modulation above referred to produces signals which are known in the telegraphic art respectively as mark signals when current is flowing and space signals when no current is flowing. In following standard telegraphic practice a marking pulse of current in loop 7 so energizes the magnetic field created by the coils 12 and 14 that the diode 13 is cut off. For no current or the so-called spacing condition the diode 13 will be in conducting condition.

The manner of applying power to the tubes in repeater section A and the interconnection of their elements will first be described. The plate of the diode 13 has a positive potential of substantially 150 volts applied thereto while its cathode is connected to ground through an impedance of suitable value and to a minus potential of substantially 150 volts.

The plate of diode 13 is connected to the grid of a triode tube 15 which in turn is energized by the application of a positive potential of approximately 150 volts and its cathode is grounded. The plate of tube 15 is connected to the grid of a triode 16 through an impedance of approximately 1 megohm. The plate of the tube 16 has a positive potential of substantially 150 volts and its grid is connected through a high impedance of substantially 2 megohms to a minus potential of substantially 150 volts. The cathode of this tube is grounded.

The plate of tube 16 is connected to the grid of a triode 17 which in turn is connected to a minus potential of approximately 150 volts. The plate of tube 17 is supplied with positive energy of substantially 150 volts while its cathode is biased through a connection to a minus potential of 15 volts through a suitable impedance. The cathode of tube 17 is connected to the grid of a triode 18 whose plate and cathode are connected to a two terminal plug for insertion in the jack 10. The plate voltage for this tube is supplied by the keying circuit of the four wire telegraph circuit.

Repeater unit B is substantially identical with repeater unit A with the exception that coils 19 and 20 associated with tube 21 may have different inductance values to perform efficiently with the characteristics of the circuit connected to the jack 11. At the jack 11 a signal is received from the receiving portion of the four wire telegraph circuit. This signal proceeds in the opposite direction to that which takes place in repeater section A. This signal is finally fed to the loop circuit 7 where it actuates a teletypewriter printer through the selector magnet coil 9, at which time the loop 7 has been conditioned to receive the signal in the conventional manner for such circuits. The signal impressed upon the coil 20 controls the flow of energy in the tube 21 in the same manner as the signal received in the coil 12 associated with the tube 13 above described. The tubes 21, 22, 23, 24 and 25 are powered and interconnected in the same manner as the corresponding tubes in repeater section A.

The function of each tube in repeater section A will now be traced when a signal has been received in the loop 7. A mark signal of positive polarity impressed on the coil 12 will cut off diode 13 causing its plate voltage and consequently the grid of tube 15 to assume a relatively high positive potential which causes the tube 15 to conduct. With tube 15 conducting its plate voltage is lowered to a value where the grid of tube 16 connected thereto causes the tube 16 to cut off. With the tube 16 cut off the tube 17 conducts due to a high positive potential impressed on its grid by reason of its connection to the plate of tube 16. With the tube 17 conducting, the tube 18 also conducts because its grid is connected to the cathode of tube 17 which at this time has a positive voltage. Since the cathode of tube 17 is positive the grid of the tube 18 is also positive because it is connected to the cathode of tube 17 thus the tube 18 conducts. Since the plate and cathode of the tube 18 is connected to the send jack 10 the signal is transmitted over the line to a distant receiver.

When a signal is received at the jack 11 and proceeds through the tubes in repeater section B the function of the respective corresponding tubes in repeater section B is the same as that of the tubes in repeater section A.

Before describing the automatic control circuits for repeater sections A and B the idle condition of all the circuits will be described. At the idle condition a steady current is flowing in the loop 7 and the winding 12 cuts off the tube 13. The tube 15 will then conduct which lowers its plate potential. The tube 16 will then cut off because its grid is connected to the plate of tube 15. The plate of the tube 16 is connected to the grid of the tube 26 located in control section A. This connection is made through a high impedance 27. The grid of tube 26 is also connected through a high impedance 28 to a negative potential of substantially 150 volts. At this time the voltage on the grid of tube 26 being positive causes it to conduct. The impedances 27 and 28 constitute a voltage controlling system for this tube. The plate of the triode 26 is connected to the grid of a triode 29 also in the control section A. With the triode 26 conducting triode 29 is cut off since its grid potential is lowered to the cut off point. The plate of the triode 29 is connected to the plate of the triode 22 in the repeater section B. Since the tubes 29 and 22 have a common plate load and since tube 29 is cut off it can exercise no control over the voltage at the plate of the triode 22. Therefore, if a signal is sent through repeater section B it will not be blocked by control circuit A.

In the idle condition of repeater section B a steady signal at the jack 11 energizes the coil 20 which cuts off the magnetically controlled tube 21. The voltage on the plate of tube 21 is thus made positive and this potential appears at the grid of the tube 22 causing it to conduct. The plate of tube 22 is connected to the grid of triode 30 which is one-half of a double triode tube. The plate of tube 22 is also connected to the grid of tube 23. Since the tube 22 is conducting its plate voltage is reduced to the point where triodes 30 and 23 are cut off. The plate of the tube 23 is connected to the grid of a triode 31. The voltage on the plate of tube 23 has at this time become sufficiently positive to cause the tube 31 to conduct. The plate of the tube 31 is connected to the grid of a triode 32 within the envelope embracing also the triode 30. Separate triodes may obviously be used at this point. With the tube 31 conducting its plate voltage and consequently the voltage on the grid of tube 32 is driven sufficiently negative to cut off the tube 32. With both tubes 30 and 32 cut off they have no control over the voltage at the plate of tube 15 in repeater section A.

It will thus be seen that in the idle condition both repeater units A and B are in condition for accepting transmission from their respective telegraph lines.

It will now be assumed that signals coming in on the loop 7 and appearing at the terminals 5 and 6 are being repeated and sent over the line connected to the send jack 10. At this time the first complete signal contains a current flow period and a no current period. The no current portion of the signal causes the tube 13 to conduct which results in its plate voltage becoming negative which cuts off tube 15. In turn the voltage on the plate of tube 15 becomes sufficiently positive to cause tube 16 to conduct. The voltage on the plate of the tube 16 drops to a value which cuts off tube 26. The tube 29 starts to conduct and cuts off after a delay of a few milliseconds.

The delay above mentioned is due to the presence of a delay circuit designed primarily to provide a time lapse starting at the end of a transmission period and at the end of which the circuit is restored to standby condition. The construction and function of the delay circuit is as follows. When the tube 26 cuts off its plate voltage rises. This positive potential is then impressed upon the plate of a diode 33 and also upon its cathode. In the latter case, through a high impedance having a value of substantially 2.2 megohms. The potential difference between the plate and cathode of the diode causes it to conduct. The current through the low forward resistance of the diode starts to charge a condenser 34 connected to its cathode. The condenser has a relatively high capacity of approximately 1 microfarad and its rate of charge is such that approximately 3.5 milliseconds will elapse before the voltage on the grid of the tube 29 will rise to the point where it will conduct. The charge in the condenser 34 will lock the tube 29 in conducting condition for a period of substantially two seconds. This delay is created by the fact that the discharge of the condenser 34 is restricted at this time to a very small current which can flow through the high impedance of substantially 2.2 megohms of the impedance 35 when the voltage on the plate of the tube 26 is low as for instance when it is conducting. This time period for the discharge of the condenser 34 is of the order of two seconds. Therefore, at the end of a transmission period and after a lapse of two seconds the circuit will return to its idle condition. While the tube 29 is cut off tubes 22 and 30 are also cut off for the duration of the transmitting period plus two seconds. Therefore, the plate of tube 22 being clamped to a low value cannot repeat any signals back to loop 7.

The plate of tube 22 is connected to the grid of tube 23, the plate of which is connected to the tube 31. The tube 31 therefore conducts by reason of its relatively high positive potential derived from the plate of tube 23. Since the tube 31 conducts, its plate potential is reduced and since this reduced potential is applied to the grid of tube 32 it is also cut off. When both tubes 30 and 32 are cut off for the duration of the transmission period they have no effect upon the plate of tube 15 in repeater section A which tube remains free to repeat signals in the loop 7 to the send jack 10.

For signals being transmitted from the receive side of the four wire telegraph circuit to loop 7, the diode 36, a condenser 37 and the impedances associated with the tube, function to apply a controlling voltage upon the grid of tube 32 in the same manner as described in connection with the diode 33 and moreover the condenser 37 clamps the tube 32 in conducting condition in the same manner as the grid of the tube 29 is clamped in conducting condition.

The tube 30 is required as a fast operating means acting without delay to lock tube 15 in marking or standby condition before the first transmission can reach the loop 7 and be coupled into repeater A. This tube will follow the mark and space signals with alternate cut off and conducting periods. Its only useful function, however, is to clamp repeater section A in marking or standby condition in response to the first transmission from the jack 11 in the four wire telegraphic circuit.

With the plate of tube 15 locked in low voltage condition tube 16 is cut off for the duration of the transmission and tubes 17 and 18 are maintained in conducting condition for the duration of the transmission thus keeping the send circuit at the jack 10 in the steady standby condition.

With tube 16 cut off tube 26 will conduct for the duration of the transmission. With tube 26 conducting tube 29 will be cut off and thus have no effect on the plate circuit of tube 22 which is free to repeat signals arriving at repeater section B.

At the end of a two second period after termination of a transmission the condenser 37 will have discharged to the point where tube 32 will no longer be locked in its protecting condition and the circuits will return to idle condition.

As above suggested, the invention may be used to repeat signals between many different types of telegraphic lines; and not only between such lines which are ordinarily incompatible but also between telegraphic lines having similar characteristics such as between two four wire one way reversible loops as described above.

The invention may also be used to extend the range of a particular telegraphic system capable of covering a known range by inserting a repeater, designed in accordance with the invention, at a point between two complete four wire one way reversible systems thereby doubling the range of the equipment.

What is claimed is:

1. A telegraphic repeater device comprising first and second repeater channels containing electron tubes through which signals are relayed respectively in opposite directions, positive and negative power supplies to energize said tubes, connections between the tube elements whereby each tube is actuated into cutoff or conducting condition by a preceding tube, control circuits having electron tubes therein associated with each of said channels, electronic switching means in each control circuit actuated respectively by signals in one of said channels to clamp at least one of the tubes in one of said control circuits in fixed controlling condition, a connection from the clamped tube to the opposite channel from that in which the signal appears thereby to prevent communication in the said other repeater channel and means to time the clamping action of said clamped tube.

2. A telegraphic repeater device comprising two repeater channels containing interconnected electron tubes and through which signals are relayed respectively in opposite directions, means to couple the input of a first repeater channel and the output of the second repeater channel to a single loop telegraphic communication line, means to couple the output of said first repeater channel and the input of said second repeater channel respectively to the sending portion of a four wire telegraph communication system and to the receiving portion of the said four wire communication system, electronic control circuits for each of said channels containing interconnected electron tubes, means to interconnect said repeater channels to said control circuits whereby when a signal appears in one repeater channel at least one of the tubes in a control circuit becomes clamped in a stable state, a connection from the clamped tube to the other repeater channel whereby a signal in one of said channels will prevent communication in the other channel through the action of the clamped tube in the control circuit.

3. A telegraphic repeater device having the elements defined in claim 2 together with electronic delay means acting to hold the clamped tube in clamped condition for a measured time period.

4. A telegraphic repeater device comprising first and second repeater channels each having a plurality of interconnected electron tubes said channels being operable to relay signals respectively in opposite directions, positive and negative power sources connected to said tubes in such a manner that each tube is actuated into cutoff or conducting condition by its preceding tube the first tube responding to a signal in the telegraph line, control circuits for each of said channels operable to establish transmission therethrough or to interrupt transmission, a clamping circuit in each of said control circuits, a condenser in each of said clamping circuits, means to measure the period of discharge of said condensers to a period of substantially one or more seconds, connections from said clamping circuits to the said repeater channels whereby signals in one repeater channel will interrupt communication in the other channel and a measured time will elapse after completion of the transmitted train of signals and the instant of unclamping of the clamping circuit.

5. A telegraphic repeater device comprising first and second repeater channels each having a plurality of interconnected electron tubes each channel being operative to relay signals respectively in opposite directions, positive and negative power sources connected to said tubes in such manner that each tube is actuated into cut off or conducting condition by its preceding tube the first tube of each repeater responding to a signal from the telegraph line, control circuits for each of said channels said circuits containing at least one clamping circuit, connections from said repeater channels to the clamping circuits in the respective control circuits whereby changing voltages in the said repeater channels produced by signals therein will lock one of said clamping circuits in a stable condition, said clamping circuit having a connection to at least one of the tubes in the other repeater channel thus to prevent communication in the other repeater channel and timing means connected to said clamping circuit acting to maintain the circuit in clamped condition for a measured period of time.

References Cited in the file of this patent

UNITED STATES PATENTS

| | | |
|---|---|---|
| 2,096,841 | Branson et al. | Oct. 26, 1937 |
| 2,280,308 | Franklin | Apr. 21, 1942 |
| 2,281,596 | Potts | May 5, 1942 |
| 2,518,027 | Krecek | Aug. 8, 1950 |